Oct. 30, 1934.   W. E. BURNS   1,978,740
METHOD OF MANUFACTURING CAN BODIES
Original Filed Jan. 27, 1928   11 Sheets-Sheet 4
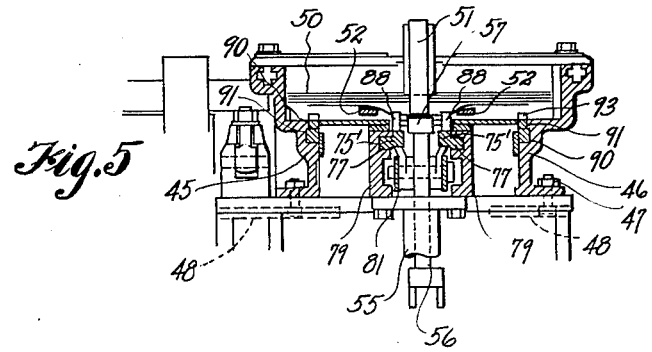
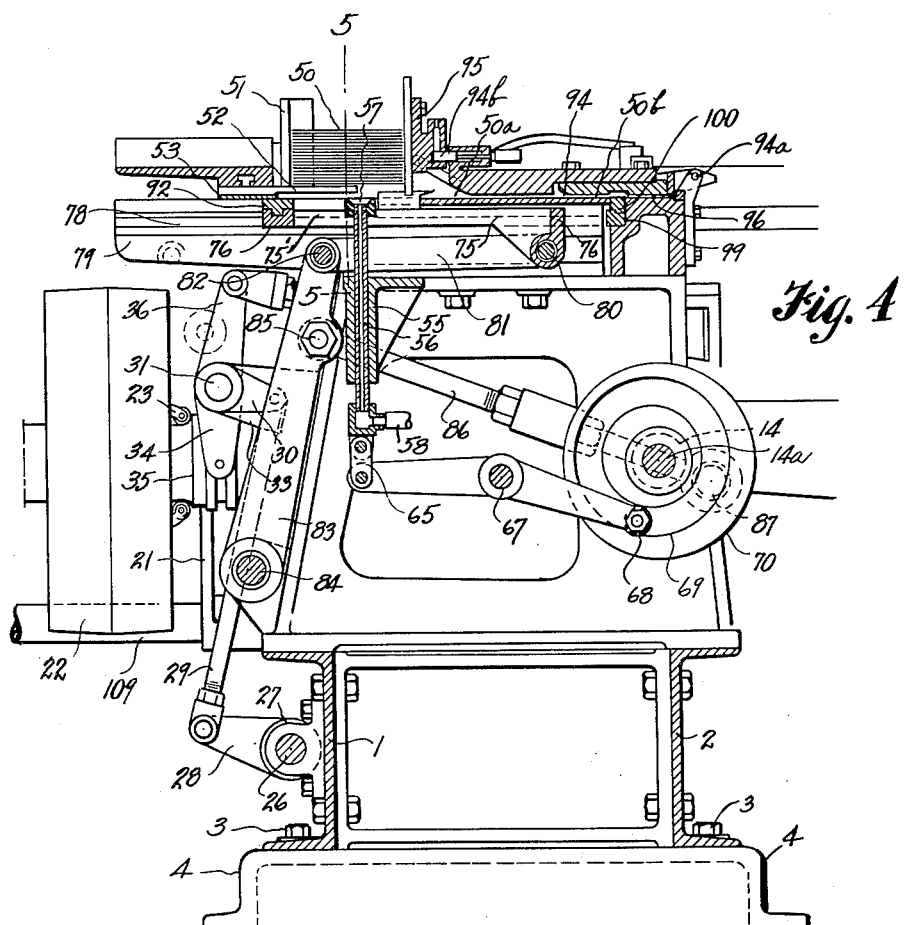

Oct. 30, 1934.    W. E. BURNS    1,978,740
METHOD OF MANUFACTURING CAN BODIES
Original Filed Jan. 27, 1928    11 Sheets-Sheet 5

INVENTOR
WILFRED E. BURNS
BY
Cook + Robinson
ATTORNEY

Oct. 30, 1934.  W. E. BURNS  1,978,740
METHOD OF MANUFACTURING CAN BODIES
Original Filed Jan. 27, 1928  11 Sheets-Sheet 6
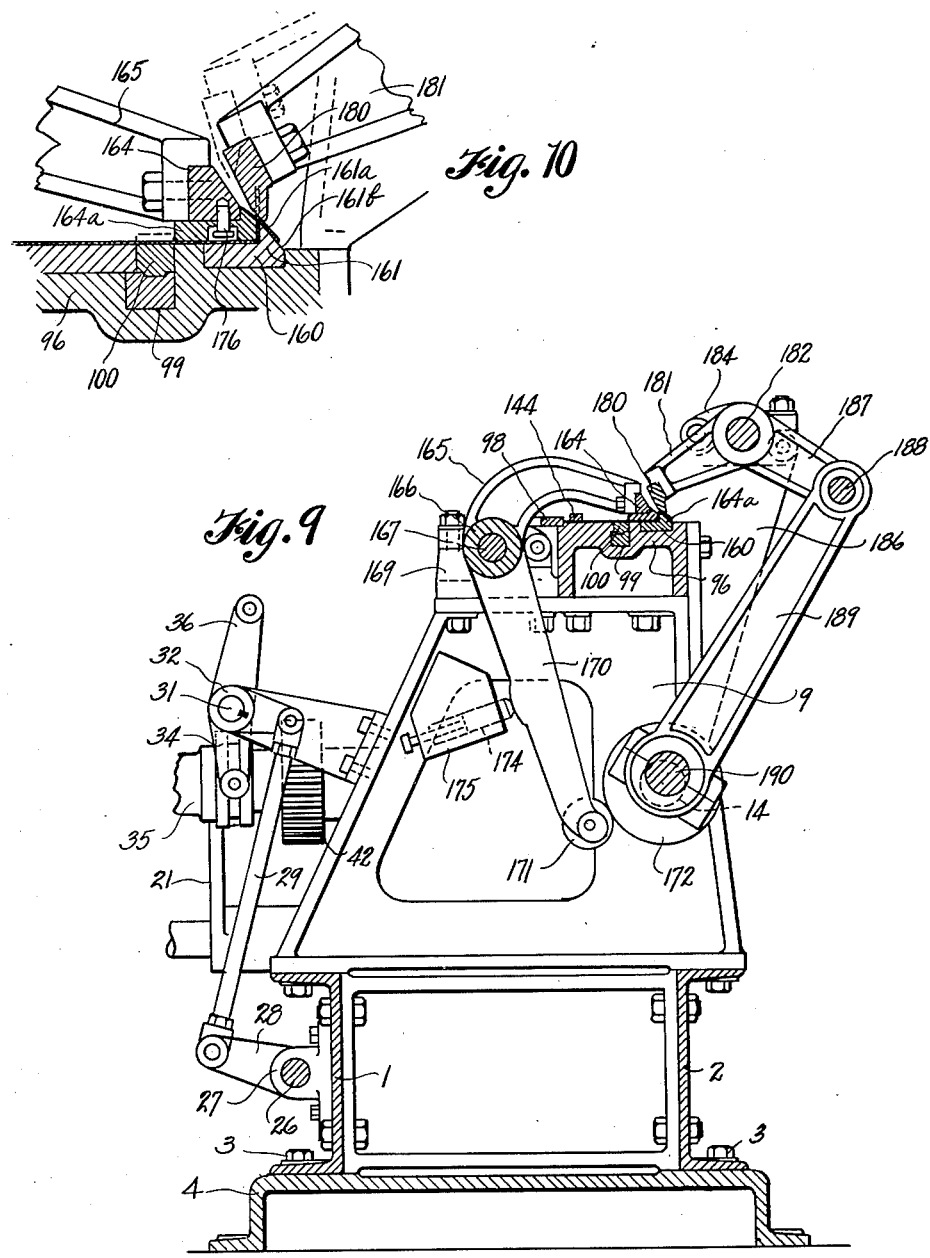
INVENTOR
WILFRED E. BURNS
BY
Cook & Robinson
ATTORNEY Oct. 30, 1934.    W. E. BURNS    1,978,740
METHOD OF MANUFACTURING CAN BODIES
Original Filed Jan. 27, 1928    11 Sheets-Sheet 7
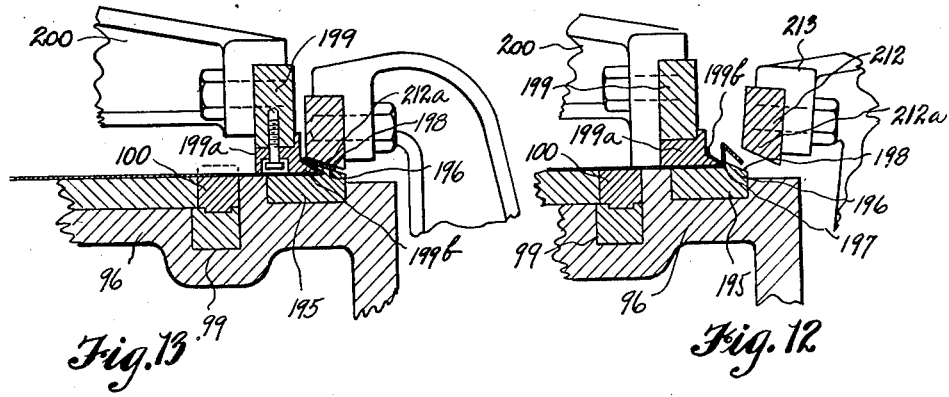
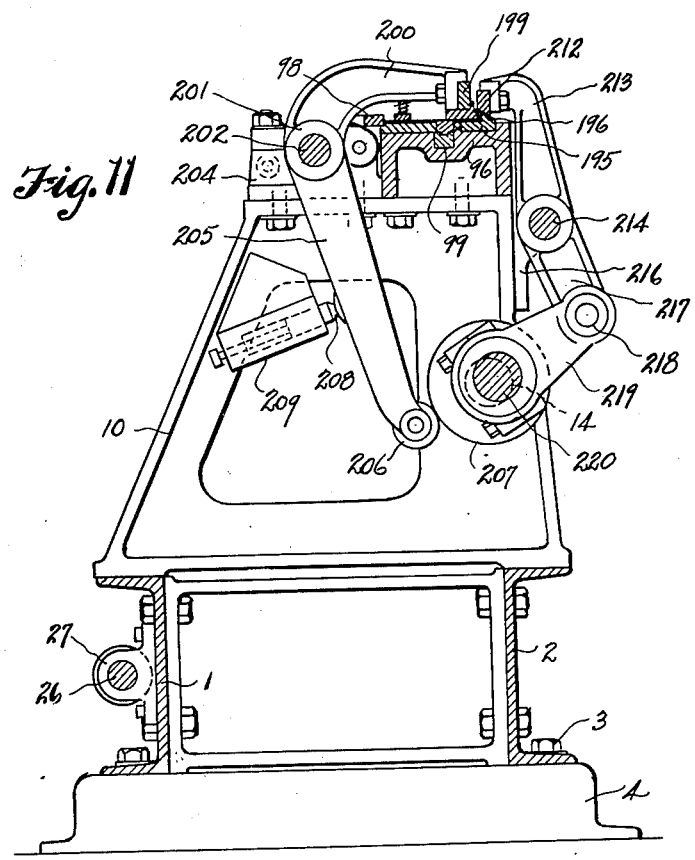
INVENTOR
WILFRED E. BURNS
BY
Cook & Robinson ATTORNEY Oct. 30, 1934.    W. E. BURNS    1,978,740
METHOD OF MANUFACTURING CAN BODIES
Original Filed Jan. 27, 1928    11 Sheets-Sheet 8
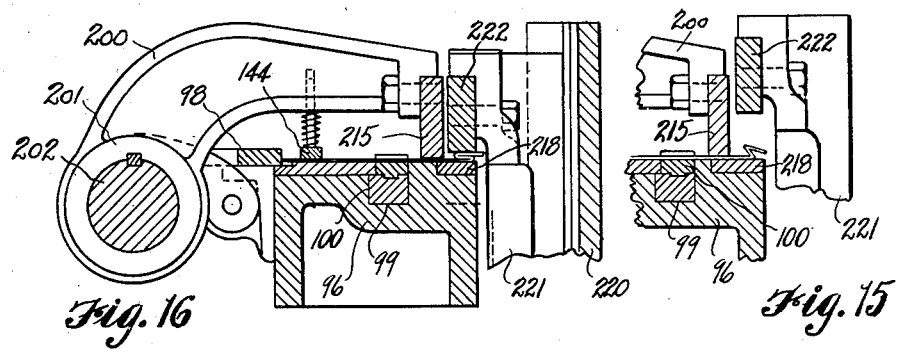
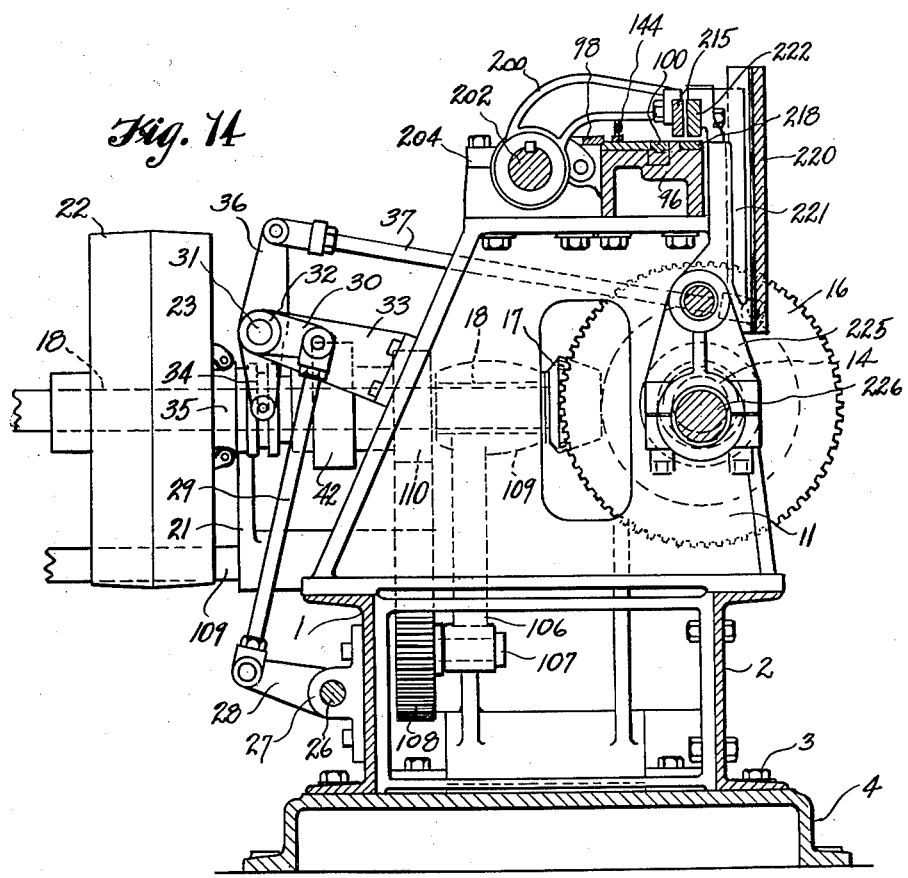
INVENTOR
WILFRED E. BURNS
BY
Cook & Robinson
ATTORNEY

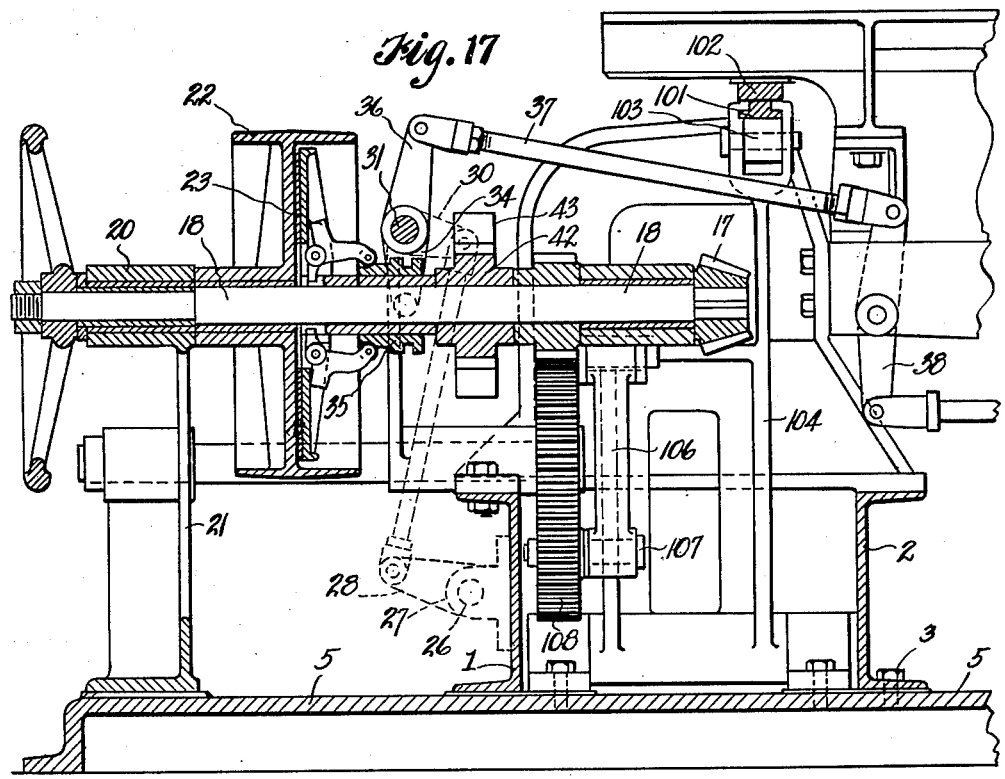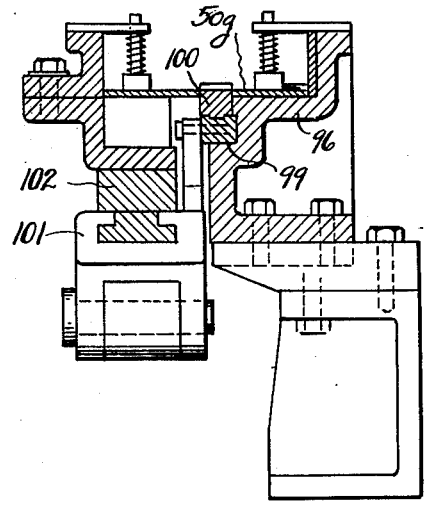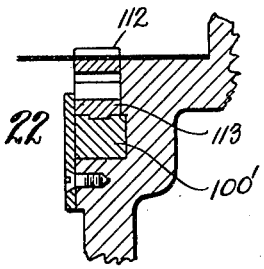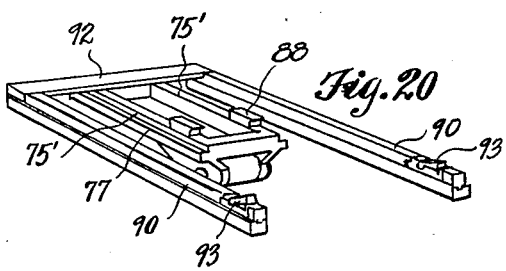

Oct. 30, 1934.  W. E. BURNS  1,978,740
METHOD OF MANUFACTURING CAN BODIES
Original Filed Jan. 27, 1928  11 Sheets-Sheet 10
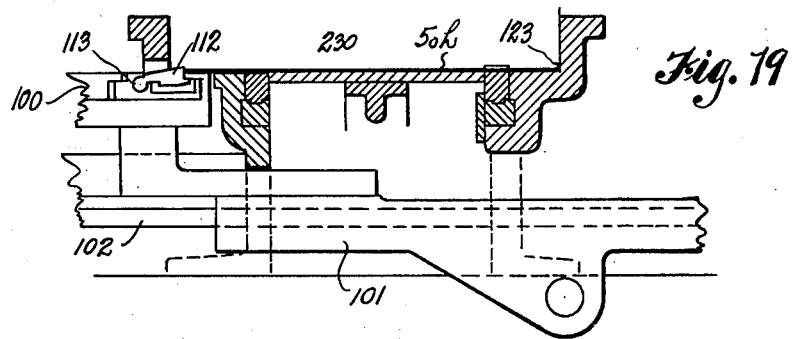
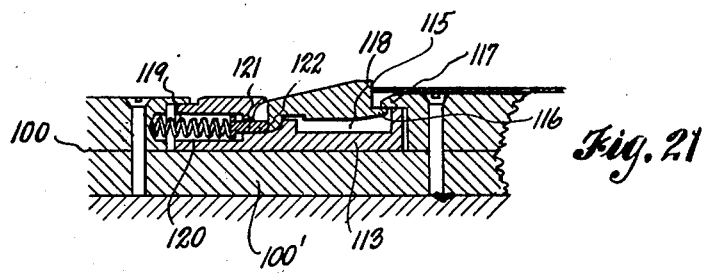
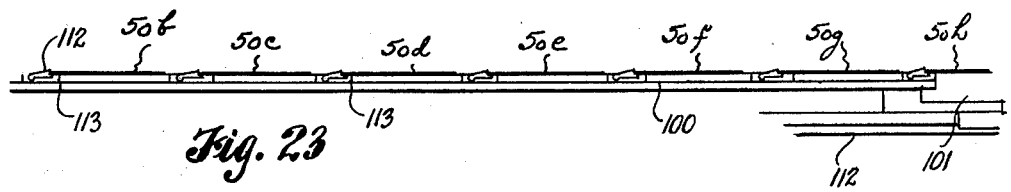
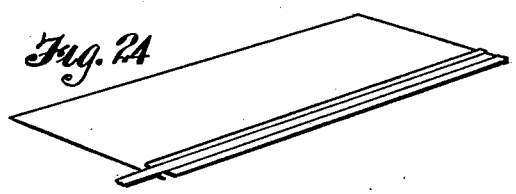
INVENTOR
WILFRED E. BURNS
BY
Cook & Robinson
ATTORNEY Oct. 30, 1934.    W. E. BURNS    1,978,740
METHOD OF MANUFACTURING CAN BODIES
Original Filed Jan. 27, 1928    11 Sheets-Sheet 11
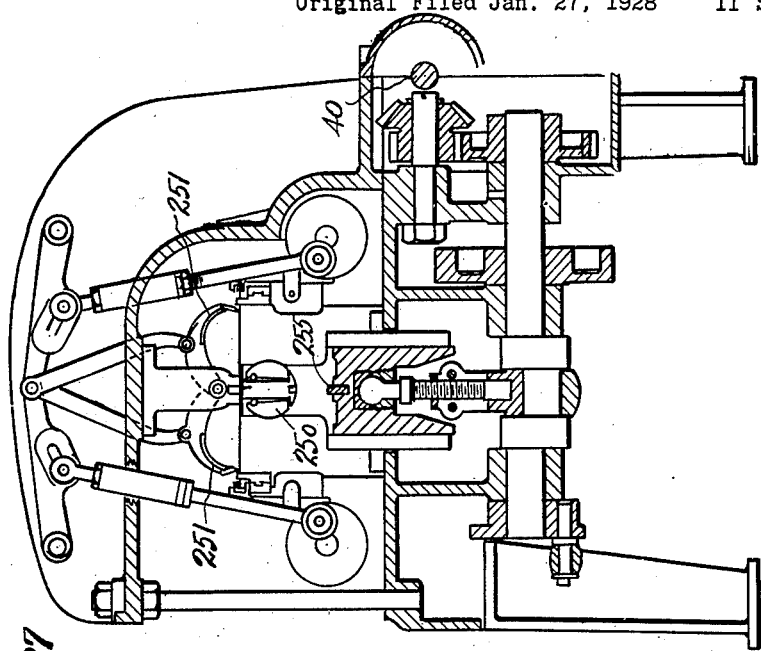
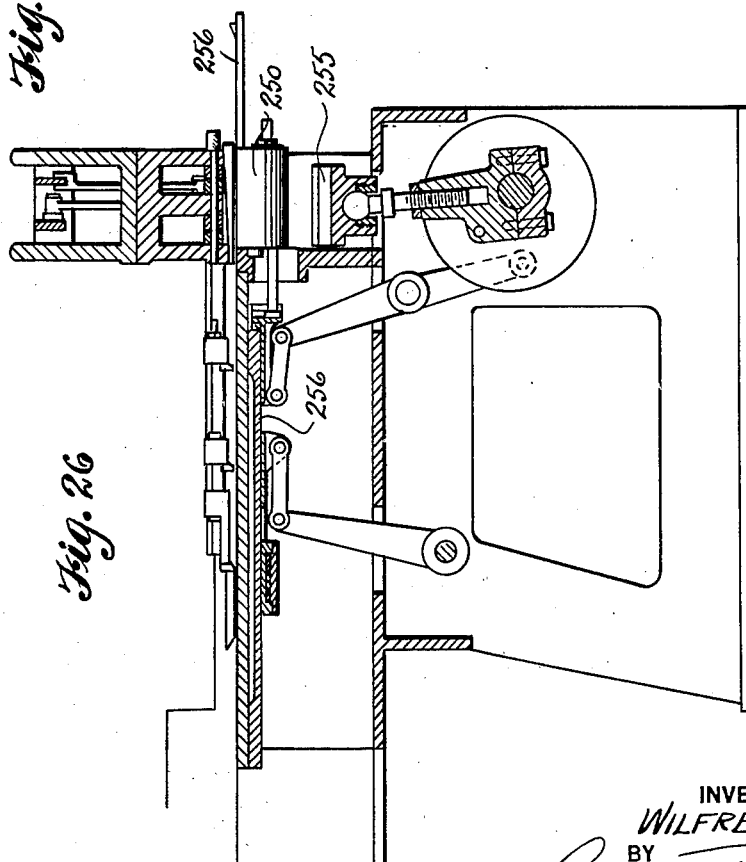
INVENTOR
WILFRED E. BURNS
BY
Cook & Robinson
ATTORNEY Patented Oct. 30, 1934

1,978,740

UNITED STATES PATENT OFFICE 1,978,740

METHOD OF MANUFACTURING CAN BODIES

Wilfred E. Burns, Burlingame, Calif., assignor to M. J. B. Co., a corporation of Delaware Original application January 27, 1928, Serial No. 249,915, now Patent No. 1,872,670, dated August 23, 1932. Divided and this application February 2, 1932, Serial No. 590,369

10 Claims. (Cl. 113—120)

This invention relates to a method of can making and it has reference in particular to the manufacture of can bodies that are characterized by an encircling collar at one end; the collar being integral with the main body portion and flanged for seaming of the end thereto and comprising a double fold with a tearing strip set off in the outer layer by two parallel lines of scoring, which strip, by use of a suitable key, may be torn out to thereby detach the end or cover from the closed can.

Explanatory to the present invention, it will be stated that, heretofore, to applicant's knowledge, there has been no practical method or machine for the automatic manufacturing of can bodies of the above character. Hand manufacture, as disclosed by the prior art, has been the only method attempted and, for present day needs, that is entirely inadequate, as well as commercially impractical.

Manifestly, the automatic manufacture of a can body of the type disclosed in United States Patent to W. E. Burns, No. 1,615,930 by the method taught by United States Patent No. 1,717,590 to Walter, would be impractical for high speed manufacture, as well as impossible, and the separate manufacture of collars and bodies and the subsequent joining of these parts, as taught in the prior art, would be impractical and not economically desirable.

In view of the above, it has been the object of this invention to provide a method for the automatic manufacture of cans of this collar type in which, by a definite sequence of operations, the scored body blanks are folded while flat to provide the collar, then their ends flanged, hooked and the blanks shaped about a forming horn and their ends finally joined together in a side seam to complete the formation of the cylindrical body; all of these various operations being done mechanically and quickly in a satisfactory and commercially practical manner, and by mechanism as described or disclosed in an application filed by me on January 27th, 1928, under Serial No. 249,915 of which this application is a divisional part.

In carrying out the various steps of the method herein disclosed, I provide mechanism disclosed in the accompanying drawings, wherein—

Fig. 2a is a plan view of the body forming mechanism used in conjunction with the folding machine, only a part of the folding machine being shown.

Fig. 4 is a cross sectional view, taken on line 4—4 in Fig. 1, illustrating the feed mechanism whereby the blanks are delivered from the supply hopper into the machine.

Fig. 5 is a sectional detail taken on line 5—5 in Fig. 4.

Fig. 9 is a cross sectional view of the machine, taken on line 9—9 in Fig. 1, through the second fold forming station.

Fig. 10 is an enlarged sectional detail view illustrating the clamping of the blank at this station and the action of the folding devices.

Fig. 11 is a cross sectional view taken on line 11—11 in Fig. 1, at the third fold forming station.

Fig. 12 is an enlarged detail view illustrating the clamping of the body blank and the condition of the fold prior to the action thereagainst of the folding bar at this station.

Fig. 13 is a similar view of the folding bar in fold forming position.

Fig. 14 is a cross sectional view of the machine at the last fold forming station; this view being taken on line 14—14 in Fig. 1.

Fig. 15 is an enlarged detail view showing the condition of the fold when the blank enters this station, with the body clamped and the fold flattening hammer in raised position.

Fig. 16 is a similar view, with the fold flattened by the hammer.

Fig. 17 is a cross sectional detail taken substantially on line 17—17 in Fig. 1, showing machine driving mechanism.

Fig. 18 is an enlarged cross section taken on line 18—18 in Fig. 1.

Fig. 19 is a sectional detail illustrating the delivery of blanks from the folding machine into the body machine.

Fig. 20 is a perspective view of the feed slide bars for feeding the body blanks from the supply hopper into the folding machine.

Fig. 21 is a detail, sectional view of one of the feed fingers of the feed bar.

Fig. 22 is a cross sectional view of the same as mounted.

Fig. 23 is a view showing the reciprocating feed bar whereby the body blanks are advanced through the folding machine.

Fig. 24 is a perspective view of a folded blank as it leaves the folding machine.

Fig. 26 is a sectional detail lengthwise of the body shaping mechanism, as on line 26—26 in Fig. 2a.

Fig. 27 is an end view of the body mechanism.

In the present machine, the can body blanks of sheet metal are stacked in a storage hopper and are fed, one at a time, into the machine by the action of a set of feed bars which operates transversely of the longitudinal direction of the machine. These primary feed bars deliver the blanks successively into a guideway where they are taken up by a main feed bar which operates reciprocally to advance them successively through a plurality of stations at which they are operated on by fold forming devices and finally delivers them, with the fold completed, into the body forming machine.

While it is very desirable from a manufacturing standpoint that the body machine be connected with the folding machine so that the folded blanks may be delivered directly thereto without interruption, it is to be understood that this is not absolutely necessary. The present drawings illustrate the blank folding machine and body shaping machine as an integral structure with a drive and control common to both.

Referring more in detail to the drawings—

1 and 2 designate parallel, spaced, channel iron beams which extend the full length of the folding mechanism as supports for the presently described transversely disposed frame structures, by means of which the fold forming and other mechanism are mounted. These beams, in turn, are suitably fixed, as by bolts 3, upon transversely disposed base bars 4 and, at the discharge end of the mechanism, to a base extension 5 of the body forming mechanism associated therewith.

Figure 1:
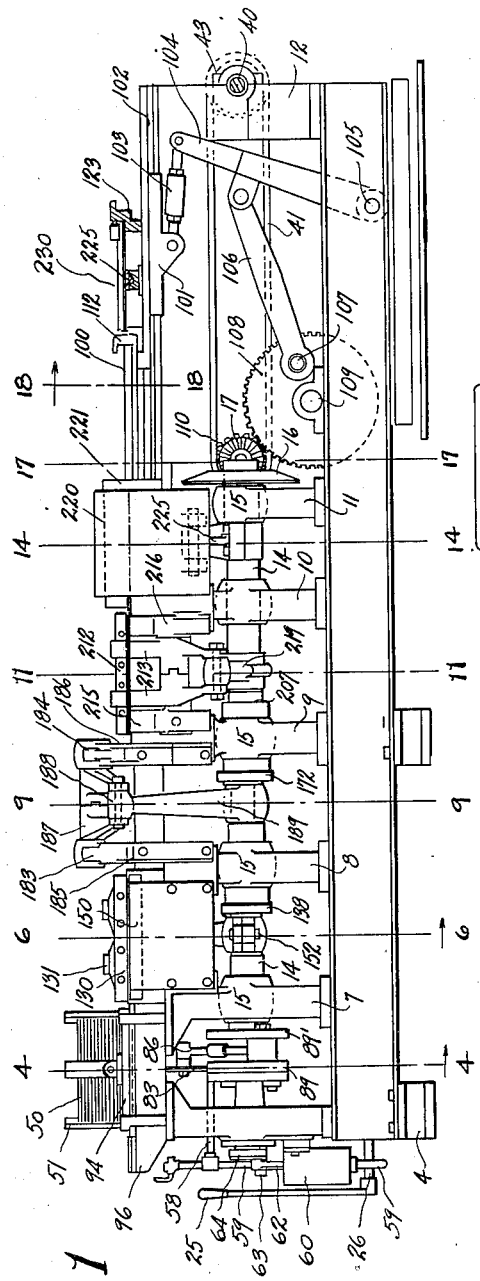
Fig. 1 is a side elevation of the mechanism used for the blank folding step of the method; the body machine being removed for better illustration.

In the present construction, there are several of the transverse frames and these are arranged at the required spaced intervals along the beams 1 and 2 for mounting the fold forming, feeding and associated mechanism and, as shown best in Fig. 1, they are designated by reference numerals 6, 7, 8, 9, 10, 11 and 12. The main drive shaft 14 for the fold forming devices extends lengthwise of the machine through the frames 7 to 11 and these latter are provided with suitable bearings 15 within which the shaft is revolubly contained. At one end, the shaft 14 has a beveled gear wheel 16 fixed thereon in mesh with a beveled pinion 17 that is keyed on the end of a driving shaft 18; this latter shaft, as shown best in Fig. 17, being mounted transversely of the machine and is supported at its inner end in a bearing 10, that is fixed to the frame 11 and, at its outer end, in a bearing 20 provided at the upper end of a standard 21 that is mounted on the base extension 5 of the body forming machine. On the shaft 18, is a belt wheel 22, by means of which the shaft is driven and which is adapted to be operatively connected or released from driving connection with the shaft by shifting of a clutch device designated at 23.

Figure 2:
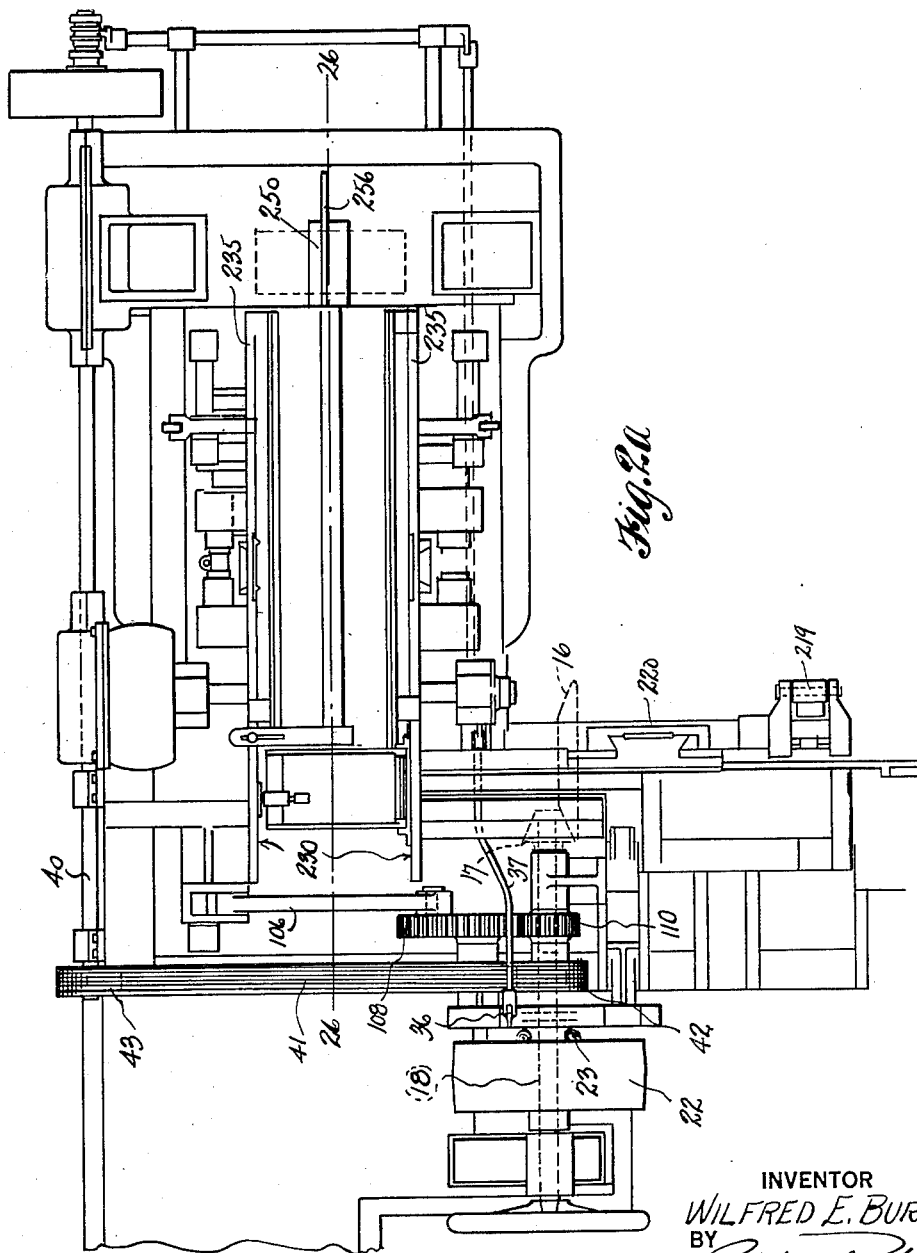
Fig. 2 is a plan view of the same.

In the present arrangement the folding machine and the body forming machine operate under the same control, with the control lever 25 as shown in Figs. 1 and 2 located at the receiving end of the machine where it is fixed to one end of a rock shaft 26 that extends along the beam 1 through suitable supporting bearings 27. At its other end, the shaft is provided with an arm 28 and this is connected by an upwardly directed link 29 with an arm 30 fixed on a shaft 31 rotatable in a bearing 32 in a bracket 33 supported from the cross frame 11. The shaft 31 has a yoke 34 keyed thereon that is operatively connected with a clutch shifting cone 35 on the shaft 18, and also has an arm 36 extending therefrom connected by a link 37 with the control lever 38 of the body forming machine; these connections being shown best in Figs. 2, 3 and 17.

The main drive shaft 40 of the body forming machine, as shown in Fig. 2a, extends parallel with the shaft 18, and it is driven from the latter shaft by means of a chain belt 41 that extends about sprocket wheels 42 and 43 that are fixed on the shafts 18 and 40, respectively. The control mechanism for these machines, as above described, is so arranged that both machines are driven through the belt wheel 22 and under the control of the lever 25, which may be actuated in opposite directions to shift the clutch 23 in or out of gear.

Figure 3:
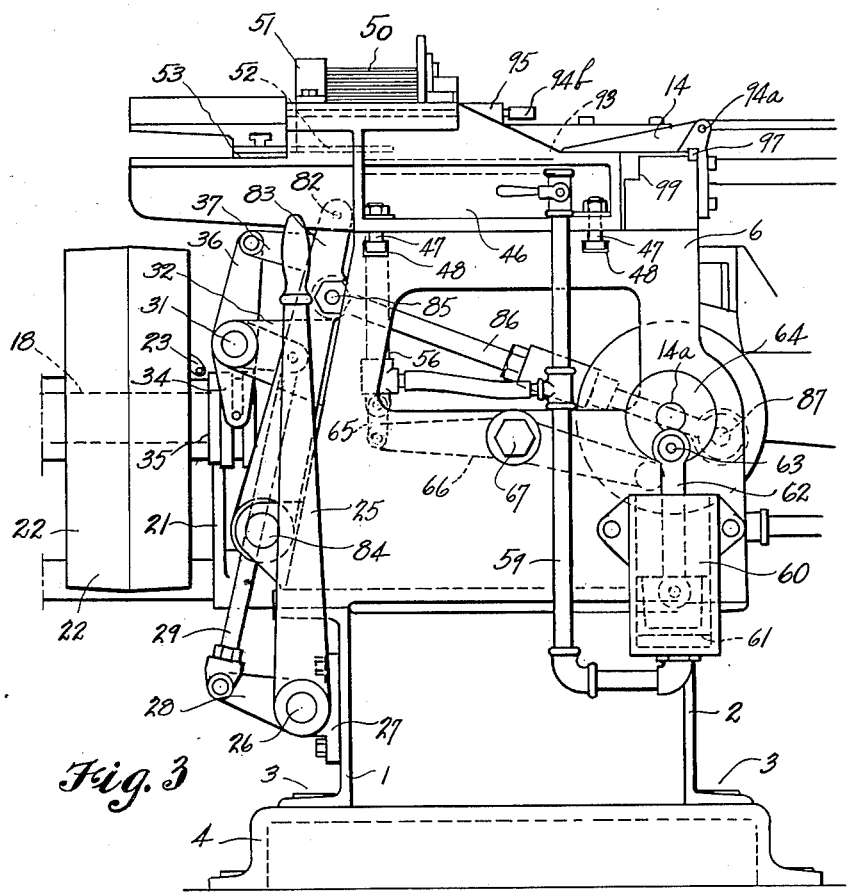
Fig. 3 is an elevation of the receiving end of the folding machine.

Fixed on the upper ends of the two transverse frames 6 and 7, at the receiving end of the machine, are housings 45 and 46, which together provide a guideway that is transversely disposed with respect to the longitudinal line of the machine, and through which the body blanks are advanced from a supply stack into the folding machine proper. These housings are adjustable from and toward each other to accommodate body blanks of different lengths and they are secured at adjusted positions by means of anchor bolts 47 which have their heads contained within dovetailed grooves 48 in the supporting frames, as shown in Fig. 3.

The can body blanks 50 are stacked, preparatory to delivery into the machine, in a feed hopper 51 supported at the outer end of the housings 45 and 46. The stack of blanks 50 is supported upon two spaced fingers 52, as shown in Figs. 4 and 5, that are fixed to a cross bar 53 extended between the housings. The means provided for feeding the blanks from the hopper into the guideway for delivery to the folding devices is as follows:

Reciprocally mounted in a bearing 55 that is fixed in the frame structure directly beneath the stack of body blanks, is a vertical tube 56 provided at its upper end with a rubber suction cup 57 that communicates with the tube. At its lower end the tube 56 is connected, by means of a flexible hose 58, with a pipe 59 which, in turn, connects at one end with a suction pump cylinder 60 that is fixed, as shown in Fig. 3, to the outside of the end frame 6. A piston 61 is operable in the cylinder by means of a connecting rod 62 attached eccentrically by a pin 63 to a disc 64 that is fixed on the end of a short shaft 14a which is carried in a bearing 15a in the frame 6 in coaxial alinement with shaft 14 and, as presently described, is rotated with shaft 14. The lower end of the suction tube 56 is also connected, by means of a short link 65, with one end of a lever 66 supported at a point between its ends by a pin 67 that is fixed to the end frame 6. The other end of the lever 66 carries a roller 68 that follows within a cam groove 69 formed eccentrically in the face of a disc 70 that is fixed on the shaft 14a.

Operating in synchronism with the vertical movement imparted to the suction tube by the connections above described, is a horizontal reciprocating feed slide 75, comprising two parallel bars 75'—75' joined rigidly at their ends by cross webs 76. On the outside of these bars (see Figs. 4, 5 and 20) are ribs 77 fitted within guide grooves 78 in paired supporting rails 79—79 that are fixed in parallel relation within the housings 45 and 46, and mounted on the upper edges of these bars in alinement are feed lugs 88. This feed slide is connected at its forward end by a pin 80 with links 81 which, in turn are connected pivotally by a pin 82 with the upper end of a lever 83 that is pivotally mounted at its lower end on a shaft 84 that extends between supports fixed to the frames 6 and 7. This lever is attached, near its upper end, by a pivot bolt 85, to one end of a connecting rod 86 which, at its other end, is mounted on a crank pin 87 extended between a pair of coaxially arranged discs 89—89' fixed on the adjacent ends of the shafts 14—14a, as shown in Fig. 1.

The mechanisms above described provide that upon rotation of the shafts 14—14a the lever 83 will be oscillated and this, through the connection of the links 81, will cause reciprocal action of the feed slide 75. Also, there is caused a vertical, reciprocal action of the suction tube 56 by the connection provided with the cam disc 70 and this action first advances the suction cup 57 upwardly against the bottom body blank of the stack and then moves it downwardly, so that, incident to the suction created in the cup through the connection with the suction pump cylinder 60, the blank will be drawn downwardly at its center, as in Fig. 5, away from the superposed blanks. Inward action of the feed slide 75 then engages the feed lugs 88 thereon with the rear edge of the blank and it is pushed thereby from the stack into the guideway to the position of the blank designated at 50a in Figs. 4 and 23.

Also, connected with the feed slide 75, is a pair of parallel feed bars 90—90 for advancing the blanks, from the position to which they are moved by the lugs 88, on into the main guideway of the machine. These bars operate parallel with the feed slide 75 in guides 91 provided therefor in the housings 45 and 46, and they are fixed at their rearward ends to the ends of a cross bar 92 that is attached to the rear end of the feed slide 75, so that they reciprocate in accordance with the reciprocal action of the feed slide. At the forward ends of the feed bars 90, are spring pressed fingers 93 which, on retractive movement of the bars, pass beneath the blank just advanced to the position 50a so that, on the following outward movement of the bars, the shouldered ends of the fingers engage with the rearward edge of the blank and advance it into a guideway which extends lengthwise of the machine and along which the blanks are then moved for operation thereon by the fold forming devices. The particular construction of these feed fingers will be described later on in connection with the main feed bar.

Overlying this transverse guideway, is a cover plate 94 supported at one edge on a hinge pin 94a and at its inner end by a releasable pin 94b that engages with a socket in a boss 95 fixed to the hopper frame.

Mounted upon the upper ends of the frames 6, 7, 8, 9, 10, and 11, and extending lengthwise of the machine, is a bed plate 96, of inverted, channel-like form, upon which the body blanks, after being delivered thereto by the transversely reciprocating feed slide 75 and bars 90, are advanced by a plurality of intermittent movements to the several folding stations. This bed plate is provided, along its side edges, with guide bars 97 and 98 which form a guideway for the advanced blanks and, centrally in its upper surface, the plate 96 has a groove 99 therein in which a feed bar 100 is reciprocally contained. This feed bar is reciprocated, by connection at one end with a slide 101 that is operable as shown in Fig. 1 on a guide rail 102 fixed in the frame as a continuation from the bar 96, between the frames 11 and 12. The slide is connected, by means of a link 103, with the upper end of a lever 104 mounted pivotally at its lower end on a shaft 105, as shown in Fig. 1, and connected, by means of a link 106, with an eccentric pin 107 on a gear wheel 108 supported in the lower part of the frame on a transverse shaft 109 and driven by a gear 110 on the shaft 18. The timing of these gears is such that the feed bar 100 is synchronized with the reciprocal action of the feed slide 75 and the body blanks that are delivered by the latter will be taken up and advanced without interruption through the several folding stations and finally delivered into the body machine.

Figure 25:
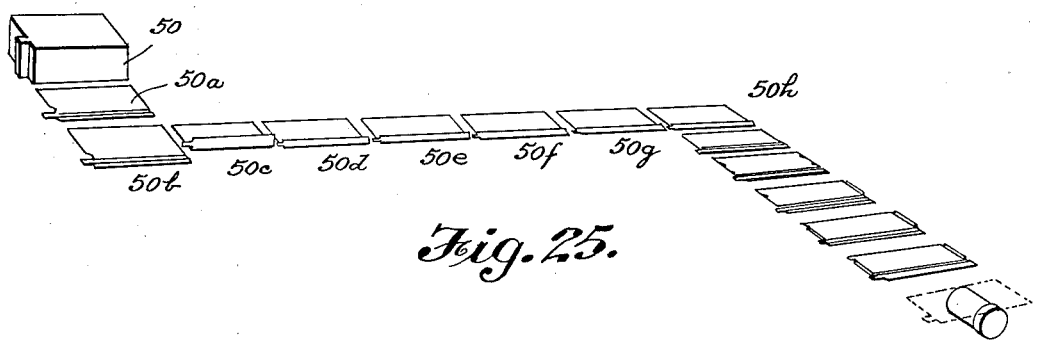
Fig. 25 is a perspective view showing body blanks at various stations to which they are successively advanced in passing through the machine, and the condition of the blanks at the different fold forming and body forming stations.

In Fig. 25, I have shown body blanks as advanced through the several stations from the supply hopper to the delivery end of the machine, and have illustrated the folded condition of the blanks at the several folding stations.

In Fig. 23 is shown the construction of the feed bar 100, whereby the blanks are advanced along the guideway through the several folding stations. This bar, at equally spaced intervals, has yieldable feed fingers 112 thereon for engagement with the rearward edges of the blanks to advance them successively from station to station with each forward movement of the bar. As shown in Figs. 21 and 22, each feed finger is pivotally mounted at one end within a mounting block 113 that is fixed to the lower section 100' of the bar. At their forward ends, the fingers have shoulders 115 adapted to engage with the blanks for advancing them and, below the shoulder, each finger is provided with an extended lip 116 adapted to engage with a stop 117 in the block to limit the upward movement of the finger. The shouldered ends of the fingers are adapted to swing downwardly into pockets 118 in the mounting blocks to permit the required depression of the fingers for passage beneath the following blanks when the bar is retracted, and the fingers are urged upwardly and are normally retained in an extended position, as in Fig. 21, by means of coiled springs 119 located within bores 120 in the blocks and bearing against pins 121 which press against shouldered portions 122 on the pivoted ends of the fingers.

By reason of the fact that the blanks, when delivered from the folding machine into the body machine, are brought into engagement with a positive stop, as designated at 123 in Fig. 19, and it is desired that they be held there momentarily until engaged by a clamp bar in the body machine, the last feed finger on the bar 100 is carried in a block 113 which, as shown in Fig. 21, has a slight longitudinal movement with respect to the feed bar. The spring 119, in this particular block, bears against the end of the pocket in which the block is contained and serves not only to retain the finger in extended position but also normally retains the block in its advance position but permits it to yield rearwardly during the final advance movement of the bar after the blank has engaged with its limiting stop. During the yielding movement of the block in the feed bar, a clamp device of the body machine engages the blank.

Figure 8:
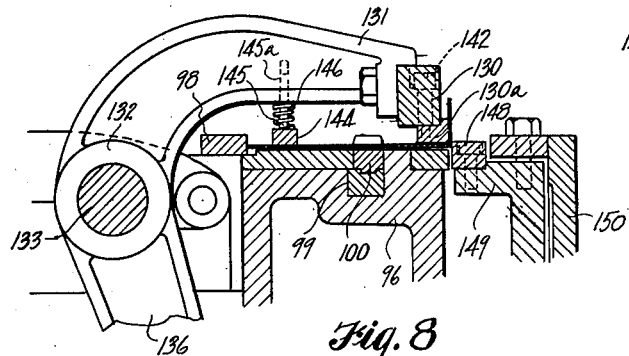
Fig. 8 is a similar view, showing the fold forming action of the folding bar.
Figure 7:
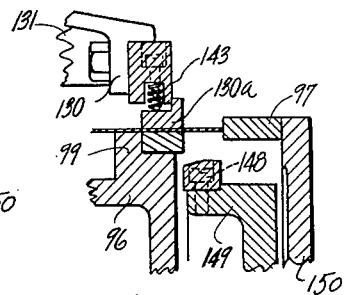
Fig. 7 is an enlarged, sectional detail, illustrating the positioning of the body blank at the first fold forming station with the folding bar at its lower limit of travel before it has acted on the body blank.
Figure 6:
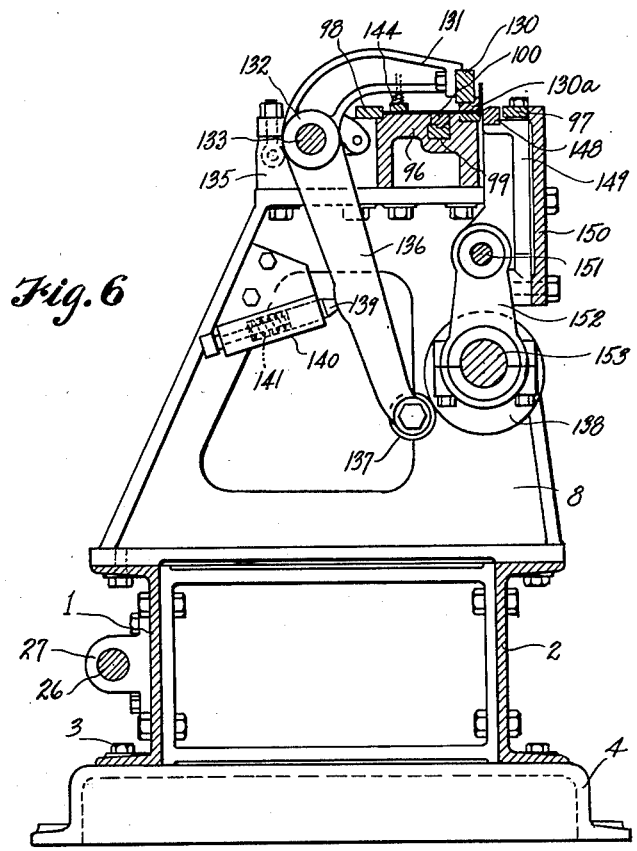
Fig. 6 is a cross sectional detail, on line 6—6 in Fig. 1 through the first folding station.

When the body blanks are forwarded from position 50a, as shown in Fig. 23, they are delivered into the main guideway formed on the bed plate 96 to the position of the blank 50b. Then, incident to successive reciprocal movements of the main feed bar 100, the blanks are advanced through the various stations designated at 50c, 50d, 50e, 50f, 50g and 50h; the last position being that within the body forming machine. The first fold forming station is that designated at 50c and the mechanism at this station and its action on the blanks is shown in Figs. 6, 7 and 8, wherein 130 designates a clamp bar fixed to the ends of a pair of clamping levers 131—131 that extend over the bed plate from a sleeve 132 rotatable on a supporting shaft 133; the latter being mounted in bearings 134—135 fixed to the frames 7 and 8. Extending downwardly from the sleeve 132 is a lever 136 equipped at its lower end with a roller 137 that has rolling contact with a cam wheel 138 eccentrically mounted on shaft 14. A plunger 139, mounted in a bearing 140 fixed to frame 8 and pressed outwardly by a spring 141, bears against the lever 136 to hold the roller against the cam surface. The action of the cam is timed with action of the feed bar 100 to cause the clamp bar to be brought down tightly against the body blank when it is advanced to this station to hold it secure for the first fold forming operation.

The clamp bar is of a novel construction so that a certain retaining pressure will be maintained at all times against the blanks to prevent their overrunning the positions to which they are advanced by action of the feed bar. As shown in Figs. 7 and 8, along the lower edge of the clamping bar 130 is a second bar 130a that is mounted by a plurality of bolts 142 which are slidable in the bar 130, and interposed between the bars 130—130a are coiled springs 143, see Fig. 7, which press the bar 130a downwardly. The pressure of these springs is slight and does not interfere with movement of the blanks by the feed bar. This retaining pressure of bar 130a is supplemented by a second bar 144 located adjacent the inner edge of the blank carried by studs 145 slidable in bores 145a in the clamp arms 131 with coiled springs 146 wound about the studs and bearing downwardly against the bar.

When entering this first forming station the blank is perfectly flat, and the clamp bar 130a, which is parallel to the edge of the blank, is clamped against it at a certain spaced distance within its outer edge, as is shown in Fig. 7. This outer edge portion of the blank is then bent upwardly at a right angle, as shown in Fig. 8, by the upward action thereagainst of a folding bar 148 fixed to the upper end of a slide 149 mounted for vertical reciprocal action on a supporting plate 150 that is fixed to the frames 7 and 8. This slide is attached by a pin 151 to a connecting rod 152 mounted on an eccentric journal 153 of the shaft 14 and the action of the slide is so timed with the clamp movement that just following the clamping action of the bar 130 against the body blank, the bar 148 will engage the free edge of the blank and will cause the latter to be folded upwardly as shown in Fig. 8; the line of the fold being at the outer clamping edge of the clamping bar 130a.

As the slide 149 moves downwardly and the pressure of clamp bar 130 is removed from the blank, it is advanced by a forward movement of the feed bar 100 to the second fold forming station, that being the station 50d in Fig. 23, where it is again operated on by devices as shown in Figs. 9 and 10 wherein 160 designates a forming plate that is set within the bed plate so as to be flush with the top surface of the latter and parallel with the edge of the body blank. This forming plate is provided with an upstanding rib 161 that extends the length of the piece and which has a vertical inner face 161a and an outwardly and downwardly inclined outer face 161b. When the body blank is advanced to this station the upturned flange formed in the previous station is disposed flatly against the vertical face 161a where it is tightly clamped, as shown in Fig. 10, by the action thereagainst of a clamp bar 164 that is carried at the ends of a pair of clamping levers 165—165 which extend across the bed plate from a sleeve 166 revoluble on a supporting shaft 167 mounted at its ends in supporting bearings 168 and 169 fixed on the frames 8 and 9. A lever 170 extends downwardly from this sleeve and at its end is a roller 171 that has rolling contact with an eccentric cam 172 on the shaft 14. A spring pressed plunger 174, slidably mounted in a bearing 175 fixed to frame 9, bears against the lever 170 to hold the roller against the cam so that, incident to rotation of the shaft 14, the clamp bar will be actuated against and from body blanks delivered to this station on the bed plate. This clamp bar 164 also is equipped along its under side with a base bar 164a which is yieldably mounted in the same manner as bar 130a at the first folding station by means of bolts 176 extended through bar 164 and springs 177 disposed between the bars. The clamp bar 164a engages flatly against the blank and also against the upturned flange to hold the latter tightly against the rib of the forming plate 160. That portion of the upturned flange that extends above the rib is then folded downwardly over the rib as shown in Fig. 10 by the action thereagainst of a folding bar 180 that is carried at the ends of a pair of levers 181—181 on a supporting shaft 182 which, at its ends, is mounted in bearings 183—184, at the upper ends of the brackets 185—186 fixed to frames 8 and 9. These levers have outwardly extending arms 187 attached by a pin 188 with the upper end of a connecting rod 189 which at its lower end is mounted on an eccentric journal 190 of shaft 14. This connection is so timed with the clamp bar action that, after the blank has been clamped as in Fig. 10, the folding bar 180 is swung downwardly from the dotted line position of Fig. 10 to the full line position and in this movement its tapered forward edge engages with that portion of the flange of the blank that extends above the rib 161 of the lower forming bar and folds it downwardly against the sloping outer face of the rib at a 45 degree bend.

It will be mentioned here that this fold is made parallel with and just below the lower line of scoring with which the blanks are provided for the formation of a tearing strip.

After this folding operation, the clamp bar 164 is released from the blank and the folding bar 180 swings upwardly and clear of the flange; the blank thereby being released for advancement at this time to the third fold forming station, as at 50c, where it is acted on by mechanisms as best shown in Figs. 11, 12 and 13, wherein 195 designates a forming plate that is set within the bed plate flush with the top of the latter, parallel with the direction of travel of the blank and which is provided at its outer edge with an upstanding rib 196 with a vertical inner face 197 that is accurately alined with the vertical face of the plate 160 at the previous station, and an inclined outer face 198. As the body blank is advanced to this station, the vertical flange previously formed in the blank engages against the inner face of the rib 196 which serves as a guide therefor. The blank, when advanced to this station, is clamped against the forming plate by the action of a clamping bar 199 mounted at the ends of a pair of clamping levers 200 extending from a sleeve 201 revoluble on a supporting shaft 202 carried at its ends in bearings 203—204 on frames 9 and 10. A lever 205 extends downwardly from the sleeve and at its end has a roller 206 in rolling contact with an eccentric cam 207 on the shaft 14. A spring pressed plunger 208 mounted in a bearing 209 fixed to frame 10 engages the lever 205 to hold the roller against its cam so that, incident to rotation of the shaft 14, the clamp bar will be actuated from and against the body blanks delivered to this station.

This clamp bar 199 has a lower yieldable portion 199a which is spring pressed, in the same manner as the corresponding parts of clamps previously described, to frictionally engage the blanks. It will also be mentioned here that the pressure bar 144, described in connection with the first folding devices of Figs. 6, 7 and 8, extends the length of the machine, and this acts also to prevent movement of the blanks in the guideway except under forwarding action of the feed bar.

On the forward edge of the clamp bar 199a is a tapered toe 199b which at its point engages the inner side of the upturned flange of the blank at the first fold and presses the blank tightly against the rib 196 of the plate 195. The upper surface of this toe is inclined at an angle of approximately 30 degrees, and after the blank has been engaged by this clamp, the folded portion of the blank is flattened against this surface by a folding bar 212 carried by a pair of lever arms 213 mounted on a supporting shaft 214 carried at its ends in bearings 215—216 fixed to the forward edges of frames 9 and 10. Arms 217 extend downwardly from these levers and are attached by a pivot pin 218 with a connecting rod 219 mounted on an eccentric journal 220 of the shaft 14, so that, incident to rotation of the shaft 14, the clamp bar 212 will be actuated from position as in Fig. 12 to position of Fig. 13 to press the partially folded portion of the blank inwardly. The bar 212 has an inclined under surface 212a corresponding to the opposed surfaces of bar 196 and the toe of clamp bar 199a, and this engages the fold to form it inwardly to the overlapped relation in which it is shown in Fig. 13.

After this folding action, the forming bar 212 moves outwardly and the clamp bar 199 lifts upwardly to release the blank for advancement to the last folding station, as at 50f in Fig. 23, where the fold is flattened by devices as shown best in Figs. 14, 15 and 16 wherein 215 designates a clamp bar section carried by the levers 200. This bar engages the blank, by action of the clamping lever 205 operated by cam 207 previously described, and holds the blank flatly against the bed plate, as in Fig. 15, with the folded portion overlying an anvil plate 218 set in the upper face of the bed plate 96. Mounted in a plate 220 fixed to the forward edges of frames 10 and 11, is a vertically reciprocating slide plate 221 which, at its upper end, carries a hammer bar 222 with a flat lower surface that is adapted, on downward movement of the slide, to be brought against the fold of the blank to flatten it out, as shown in Fig. 16. This slide is operated by connection at its lower end with a connecting rod 225 which is mounted on an eccentric journal 226 of shaft 14. After this flattening action by the hammer bar 222, the slide moves upwardly as the clamp bar 215 is released and the feed bar 100 operates to advance the blank to the idle station, 50g, and on the following advance movement, into the guideway 230, see Figs. 1 and 19, of the body forming machine. After entering the body machine, the blank is advanced and operated on to form it into a cylindrical body.

The body forming mechanism employed in conjunction with the folding mechanism could be any of the well known body makers now in general use. In this instance, it has been illustrated as that of the patent issued to Nelson Troyer on June 23, 1925, Serial No. 1,543,460, and herein it will be only briefly described since this part of the machine, in itself, forms no part of the present invention.

The body shaping mechanism shown comprises a pair of parallel folder housings 235—235 extended the length of the body shaping mechanism and forming the guideway 230. A reciprocating feed slide 236, similar in construction and mode of operation to the feed bar 100, and operating in synchronism therewith, operates to advance the blanks, by intermittent movements, along the guideway past the notching and edging devices provided therein, as disclosed in the patent, and these operate, as clearly described, to notch and oppositely hook the ends of the blanks.

The blanks finally are disposed directly above a cylindrical forming horn 250 and by the action thereagainst of a pair of swingingly movable wing clamps 251—251, their opposite end portions are wrapped about the horn with ends overlapped. An expanding action of the horn joins the end hooks together and the side seam is then clinched by the action of a bumper 255 thereagainst. On completion of the seam, in this manner, the body is advanced from the horn and may then pass onto the solder horn.

In this body mechanism, the feed slide, notching dies, flange forming slides, wing clamps and bumper are actuated in synchronism from the driven shaft 40 and this is under control of the main drive shaft 18.

It is apparent from the above description of mechanism and mode of operation, that the bodies with the folded collars, are formed completely by mechanical means in a definite sequence of operations which makes possible high speed production and a commercially satisfactory can body.

Having thus described my invention, what I claim as new therein and desire to secure by Letters Patent is—

1. The method of mechanically and automatically making a can body provided with an integral, folded collar at one end, which consists of presenting the body blank to devices for folding the blank to form the collar portion while the blank is flat, then automatically advancing the folded blank to devices for forming end hooks on the blank, then to devices for bending the blank to body form and finally to devices for securing the end hooks together in a permanent seam.

2. The method of mechanically and automatically making a can body having an integral, encircling collar at one end, which includes preparing the blank, presenting the body blank to devices for folding the collar while the blank is flat then mechanically advancing the blank to devices which operate thereon for notching the ends, forming the end hooks bending the blank about a shaping horn, interlocking the hooks and finally clinching the hooks together in a permanent seam.

3. The method of mechanically and automatically preparing a can body of that character provided with an encircling fold formed with a tearing strip, which includes presenting a prepared and scored blank to devices for folding the blank while it is in the flat to locate the strip in the outer layer of the fold, then to devices for shaping the body and seaming the ends of the blank together in body form.

4. The method of mechanically making a tearing strip can body having an encircling collar formed by a plural layer fold which includes presenting the blank formed with scoring to define the strip to devices for folding the blank to form the plural layer fold with the strip located in the outer layer of the fold, then to other devices for bending the blank about a body shaping horn and for joining its ends together in a permanent seam.

5. The method of mechanically making can bodies of the character described, which includes advancing blanks mechanically in succession by intermittent movements past devices which operate thereon during periods of rest to form a fold in each blank along one edge thereof while the blank is flat, then to form hooks at the ends of the blank, then to bend the blanks about a body shaping horn and then to join the hooked ends in a permanent seam.

6. The method of mechanically making a tearing strip collar can, including presenting a scored blank to mechanical devices whereby the blank is folded while flat to include the tearing strip within the limits of the collar, then to devices whereby end edges of the blanks are hooked, then to devices which wrap the blank about a body shaping horn, and cause the hooks to interlock, then to bump and finally close the seam in a hermetically closed joint.

7. The method of mechanically making a can body of the character disclosed which includes presenting a body blank, with tearing strip formed therein, to mechanically actuated devices for forming the blank with a plural layer fold including the tearing strip within the limits thereof, then presenting the blank to mechanically actuated devices for joining its ends to form the body with the collar encircling it.

8. The method of mechanically making a can body of the character disclosed which includes presenting a body blank, formed with a tearing strip terminating in a tongue at an edge of the blank, to devices for folding the blank while flat to form a plural layer collar fold, including the tearing strip in an exposed layer thereof, then presenting the blank to devices for bending it to a body form and for joining its ends in a permanent seam with the collar fold encircling the body and with the end of the tearing strip tongue exposed.

9. The method of mechanically making a can body of the character disclosed including presenting a body blank, formed with a tearing strip terminating in a tongue at one edge of the blank, to devices for folding the blank while in the flat to form a plural layer collar fold throughout the length thereof with the tearing strip included in the outer layer of the folded portion, then mechanically applying the folded blank to a shaping horn and to devices whereby it is shaped to the horn and its ends then joined in a permanent seam with the collar fold encircling the body and the end of the tongue exposed and free for applying a key thereto.

10. The method of mechanically manufacturing tearing strip collar cans of the character disclosed, which comprises presenting a body blank, prepared with a tearing strip terminating in a tongue extending at one edge of the blank, to devices for bending it to form a flat plural layer fold throughout the length thereof with the tearing strip located in the outer layer of the fold, then mechanically presenting the blank to a body shaping horn and devices for shaping it about the horn and to overlap its ends, and to devices for permanently joining the overlapped ends with the end of the tearing strip tongue exposed for application of a key thereto.

WILFRED E. BURNS.